Sept. 5, 1961     CARL-ERIK GRANQVIST     2,998,751

KERR CELL

Filed Feb. 21, 1958

INVENTOR
CARL-ERIK GRANQUIST,

BY Larson and Taylor

ATTORNEYS

United States Patent Office 2,998,751
Patented Sept. 5, 1961

2,998,751
KERR CELL
Carl-Erik Granqvist, Lidingo, Sweden, assignor to Svenska Aktiebolaget Gasaccumulator, Lidingo, Sweden, a corporation of Sweden
Filed Feb. 21, 1958, Ser. No. 716,614
Claims priority, application Sweden Mar. 9, 1957
2 Claims. (Cl. 88—61)

In Kerr cells for light modulating purposes, there is in general some variation in the influence that is exerted on the incoming light depending upon in which area of the cell the light passes due to the fact that different areas yield different amounts of rotation of the plane of polarization. In order to obtain the same influence on the light on different occasions, it has been necessary to concentrate the passage of the light as accurately as possible to the same location.

It has been attempted earlier to avoid this disadvantage through an arrangement having double electrodes. This gives some improvement but increases the capacity of the electrode system, causing the cell to consume more electrical energy.

A fundamental reason for the inhomogeneity of the field between the cell electrodes seems to be currents in the cell fluid owing to ionization of the same and the flow of ions set up thereby. If plate electrodes are used, this implies that currents flow along an electrode plate at right angles to the field.

The present invention removes this disadvantage through an electrode arrangement enabling flow of fluid normally to the electrode plane. The electrodes may, for example, be of net or grid form.

Figure 1:
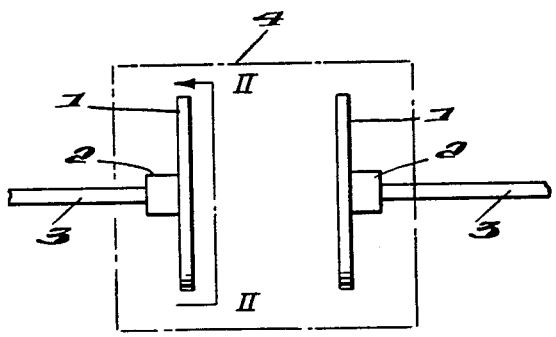
Figure 2:
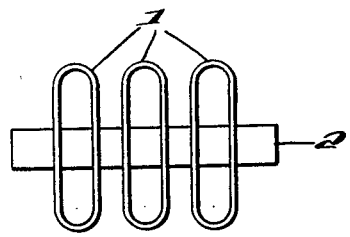

An embodiment of the invention is shown on the attached drawing, in which FIG. 1 shows a schematic view of the electrode arrangement of a Kerr cell as viewed in the direction of the light stream and FIG. 2 shows a view of an electrode as viewed in the field direction.

In FIG. 1, the electrode proper is designated 1 and comprises a plurality of loops 1 mounted on a cross bar 2 in a manner which is apparent from FIG. 2, this figure showing a view according to the arrows II of FIG. 1. The electrode lead is designated 3 and the cell housing is indicated by 4.

The loops shown are obviously only one of a large number of possible embodiments. The essential thing is that a flow through the electrode system is possible in the direction of the field.

What is claimed is:
1. In a light modulator for modulating light passing therethrough in a predetermined direction, a Kerr cell comprising a fluid-filled container, a pair of substantially plane electrodes immersed in the fluid, said electrodes being parallel to said predetermined direction and being spaced from the walls of said container, and means to enable a flow of ionic fluid through said electrodes in a direction perpendicular thereto, said means including openings in the electrodes whereby a substantially homogenous field is maintained within said cell with substantially no ionic flow parallel to the electrodes.
2. In a light modulator for modulating light passing therethrough in a predetermined direction, a Kerr cell comprising a fluid-filled container, a pair of substantially plane electrodes immersed in the fluid, said electrodes being parallel to said predetermined direction and being spaced from the walls of said container, each electrode comprising a cross bar and a plurality of loops mounted thereon whereby ionic fluid flow perpendicular to said electrodes and not parallel thereto maintains a substantially homogeneous field within said cell.

References Cited in the file of this patent

UNITED STATES PATENTS

| | | |
|---|---|---|
| 1,808,137 | Hartley | June 2, 1931 |
| 1,870,017 | Michelssen | Aug. 2, 1932 |
| 2,042,344 | La Via | May 26, 1936 |

OTHER REFERENCES

"Final Measurements of the Velocity of Light," Anderson, Journal of the Optical Society of America, vol. 31, No. 3, March 1941 (pages 188 and 189 relied upon).